US011967731B2

(12) United States Patent
Sung et al.

(10) Patent No.: US 11,967,731 B2

(45) Date of Patent: Apr. 23, 2024

(54) SEPARATOR FOR ELECTROCHEMICAL DEVICE AND ELECTROCHEMICAL DEVICE CONTAINING SAME

(71) Applicant: LG CHEM, LTD., Seoul (KR)

(72) Inventors: In-Hyouk Sung, Daejeon (KR); Hye-Jin Kwon, Daejeon (KR); Dong-Wook Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 773 days.

(21) Appl. No.: 17/042,520

(22) PCT Filed: Dec. 20, 2019

(86) PCT No.: PCT/KR2019/018234

§ 371 (c)(1),
(2) Date: Sep. 28, 2020

(87) PCT Pub. No.: WO2020/130723

PCT Pub. Date: Jun. 25, 2020

(65) Prior Publication Data

US 2021/0028428 A1 Jan. 28, 2021

(30) Foreign Application Priority Data

Dec. 21, 2018 (KR) ........................ 10-2018-0167923

(51) Int. Cl.

| | |
|---|---|
| ***H01M 50/44*** | (2021.01) |
| ***H01M 4/62*** | (2006.01) |
| ***H01M 10/05*** | (2010.01) |
| ***H01M 10/0525*** | (2010.01) |
| ***H01M 50/443*** | (2021.01) |
| ***H01M 50/446*** | (2021.01) |
| ***H01M 50/48*** | (2021.01) |
| ***H01M 50/489*** | (2021.01) |

(52) U.S. Cl.

CPC ......... *H01M 50/446* (2021.01); *H01M 4/622* (2013.01); *H01M 10/0525* (2013.01); *H01M 50/443* (2021.01); *H01M 50/489* (2021.01)

(58) Field of Classification Search

None

See application file for complete search history.

(56) References Cited

U.S. PATENT DOCUMENTS

| | | | |
|---|---|---|---|
| 9,508,975 B1 | 11/2016 | Matsuo | |
| 2010/0015530 A1 * | 1/2010 | Katayama ................ | H01G 9/02 429/251 |
| 2012/0094184 A1 | 4/2012 | Abe et al. | |
| 2016/0149187 A1 | 5/2016 | Cho et al. | |
| 2018/0180858 A1 | 7/2018 | Yoon et al. | |
| 2018/0233726 A1 | 8/2018 | Nagao | |
| 2019/0131604 A1 | 5/2019 | Yoon et al. | |
| 2019/0245182 A1 | 8/2019 | Liao et al. | |
| 2019/0245183 A1 | 8/2019 | Jeong et al. | |

FOREIGN PATENT DOCUMENTS

| | | |
|---|---|---|
| CN | 103915591 A | 7/2014 |
| CN | 205810930 U | 12/2016 |
| CN | 106684293 A | 5/2017 |
| CN | 107275550 A | 10/2017 |
| JP | 2001-527274 A | 12/2001 |
| JP | 2008-4439 A | 1/2008 |
| JP | 2013-84367 A | 5/2013 |
| JP | 5588437 B2 | 9/2014 |
| JP | 2018-32537 A | 3/2018 |
| KR | 10-2016-0061164 A | 5/2016 |
| KR | 10-2016-0109669 A | 9/2016 |
| KR | 10-1660208 B1 | 9/2016 |
| KR | 10-2018-0018408 A | 2/2018 |
| KR | 10-2018-0094778 A | 8/2018 |
| WO | WO 99/33125 A1 | 7/1999 |
| WO | WO 2018/147714 A1 | 8/2018 |

OTHER PUBLICATIONS

International Search Report for PCT/KR2019/018234 dated Apr. 1, 2020.

Thongdee et al. "Effect of Peptizing Agent Concentration on Morphology of Unsupported Alumina Membrane" Key Engineering Materials ISSN: 1662-9795, vol. 766, 2018, pp. 71-76.

XiaoRui et al. "Preparation and Properties of Organic and Inorganic Particle Coated Polypropylene Microporous Membrane", School of Materials and Energy Guangdong University of Technology, Jun. 2016. pp. 1-69 (81 pages total) with an English abstract.

Extended European Search Report for European Application No. 19899096.2, dated Aug. 4, 2021.

* cited by examiner

*Primary Examiner* — Maria Laios
*Assistant Examiner* — Angela J Martin
(74) *Attorney, Agent, or Firm* — Birch, Stewart, Kolasch & Birch, LLP

(57) ABSTRACT

A separator for an electrochemical device, including: a porous polymer substrate having a plurality of pores; and a porous coating layer on at least one surface of the porous polymer substrate, wherein the porous coating layer comprises boehmite particles and a binder polymer, wherein the binder polymer is positioned on at least a part of the surface of the boehmite particles and connects and fixes the boehmite particles with one another. The boehmite particles have an average particle diameter of 2.0 μm to 3.5 μm and a specific surface area of 4.0 $m^2/g$ to 4.5 $m^2/g$, and one side of the porous coating layer has a thickness of 2 μm to 10 μm.

12 Claims, No Drawings

SEPARATOR FOR ELECTROCHEMICAL DEVICE AND ELECTROCHEMICAL DEVICE CONTAINING SAME

TECHNICAL FIELD

The present disclosure relates to a separator applicable to an electrochemical device, such as a lithium secondary battery, and an electrochemical device including the same.

The present application claims priority to Korean Patent Application No. 10-2018-0167923 filed on Dec. 21, 2018 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by applying a mixture of an excessive amount of inorganic particles with a binder polymer onto at least one surface of a porous substrate having a plurality of pores.

According to the related art, alumina has been used mainly as inorganic particles contained in the porous coating layer. However, alumina has high hardness to cause a high degree of wearing in processing equipment, and thus it is likely that a separator is damaged by external foreign materials. In addition, a porous polymer substrate may be damaged during a hot fusion process due to such high hardness.

In addition, there is a need for a separator which is provided in the form of a thin film, has high adhesion to an electrode and shows improved heat shrinkage in order to improve energy density.

DISCLOSURE

Technical Problem

The present disclosure is directed to providing a separator which is provided in the form of a thin film, shows improved heat shrinkage and improved adhesion to an electrode, and has reduced resistance.

Technical Solution

In one aspect of the present disclosure, there is provided a separator for an electrochemical device according to any one of the following embodiments.

According to the first embodiment of the present disclosure, there is provided a separator for an electrochemical device, including:

a porous polymer substrate having a plurality of pores; and a porous coating layer on at least one surface of the porous polymer substrate, wherein the porous coating layer comprises boehmite particles and a binder polymer, wherein the binder polymer is positioned on at least or a part of the surface of the boehmite particles and connects and fixes the boehmite particles with one another, wherein the boehmite particles have an average particle diameter of 2.0 μm to 3.5 μm and a specific surface area of 4.0 $m^2/g$ to 4.5 $m^2/g$, and one side of the porous coating layer has a thickness of 2 μm to 10 μm.

According to the second embodiment of the present disclosure, there is provided the separator for an electrochemical device as defined in the first embodiment, wherein the boehmite particles have an average particle diameter of 2.5 μm to 3.5 μm and a specific surface area of 4.0 $m^2/g$ to 4.2 $m^2/g$.

According to the third embodiment of the present disclosure, there is provided the separator for an electrochemical device as defined in the first or the second embodiment, wherein the binder polymer includes a particle-type binder polymer.

According to the fourth embodiment of the present disclosure, there is provided the separator for an electrochemical device as defined in the third embodiment, wherein the particle-type binder polymer includes styrene butadiene rubber, acrylonitrile-butadiene rubber, acrylonitrile-butadiene-styrene rubber, polymethyl methacrylate-co-ethylhexyl acrylate, polyacrylonitrile, polyvinyl chloride, polyvinylidene fluoride, polyvinyl alcohol, styrene, polycyanoacrylate, or a mixture of two or more of them.

According to the fifth embodiment of the present disclosure, there is provided the separator for an electrochemical device as defined in any one of the first to the fourth embodiments, wherein the weight ratio of the inorganic particles: total binder polymers is from 80:20 to 50:50.

According to the sixth embodiment of the present disclosure, there is provided the separator for an electrochemical device as defined in the third embodiment, wherein the particle-type binder polymer is present in an amount of 70 to 99 parts by weight based on 100 parts by weight of the total amount of the binder polymer.

According to the seventh embodiment of the present disclosure, there is provided the separator for an electrochemical device as defined in any one of the first to the sixth embodiments, wherein the porous polymer substrate is a polyolefin-based porous polymer film substrate or a porous polymer nonwoven web substrate.

According to the eighth embodiment of the present disclosure, there is provided the separator for a lithium secondary battery as defined in the seventh embodiment, wherein the porous polymer substrate is the polyolefin-based porous polymer film substrate, which includes polyethylene, polypropylene, polybutylene, polypentene, or a mixture of two or more of them.

According to the ninth embodiment of the present disclosure, there is provided the separator for an electrochemical device as defined in any one of the first to the eighth embodiments, wherein an adhesion strength of the separator to an electrode (Lami strength) is 20 gf/15 mm or more and a resistance of the separator is 0.90 ohm or less.

According to the tenth embodiment of the present disclosure, there is provided the separator for an electrochemical device as defined in any one of the first to the ninth embodiments, wherein one side of the porous coating layer has a thickness of 2 μm to 3 μm.

According to the eleventh embodiment of the present disclosure, there is provided the separator for an electrochemical device as defined in any one of the first to the tenth embodiments, wherein the porous coating layer is formed on both surfaces of the porous polymer substrate, and a total thickness of the porous coating layers is 4 μm to 20 μm.

According to the twelfth embodiment of the present disclosure, there is provided the separator for an electrochemical device as defined in any one of the first to the eleventh embodiments, wherein an adhesion strength of the separator to an electrode (Lami strength) is 20 gf/15 mm or more, and wherein the separator has a heat shrinkage of 42% or less in the machine direction (MD) and a heat shrinkage of 40% or less in the transverse direction (TD) at a temperature of 150° C.

In another aspect of the present disclosure, there is also provided an electrochemical device according to any one of the following embodiments.

According to the thirteenth embodiment of the present disclosure, there is provided an electrochemical device including a cathode, an anode and a separator interposed between the cathode and the anode, wherein the separator is the same as defined in any one of the first to the twelfth embodiments.

According to the fourteenth embodiment of the present disclosure, there is provided the electrochemical device as defined in the thirteenth embodiment, which is a lithium secondary battery.

Advantageous Effects

According to an embodiment of the present disclosure, it is possible to provide a separator having improved adhesion to an electrode and reduced resistance by controlling the average particle diameter ($D_{50}$) and specific surface area (BET) of boehmite particles.

In addition, it is possible to provide a separator with improved heat shrinkage in the form of a thin film having a smaller thickness as compared to the conventional separators by controlling the particle diameter and specific surface area of boehmite.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part 「includes」 an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

To solve the safety-related problem of an electrochemical device, such as a lithium secondary battery, there has been suggested a separator including a porous coating layer formed by applying a mixture of an excessive amount of inorganic particles with a binder polymer to at least one surface of a porous polymer substrate having a plurality of pores.

According to the related art, alumina has been used mainly as inorganic particles contained in the porous coating layer. However, alumina has high hardness to cause a high degree of wearing in processing equipment, and thus it is likely that a separator is damaged by external foreign materials. In addition, a porous polymer substrate may be damaged during a hot fusion process due to such high hardness.

To overcome the above-mentioned problems, boehmite having low hardness has been used to improve damages upon the porous polymer substrate. However, there still is a need for a separator having improved physical properties.

The inventors of the present disclosure have focused on the above-mentioned problems, and the present disclosure is directed to providing a separator having improved adhesion to an electrode and reduced resistance.

The present disclosure is also directed to providing a separator which is provided in the form of a thin film and shows improved heat shrinkage and improved adhesion to an electrode in order to improve energy density.

In one aspect of the present disclosure, there is provided a separator for an electrochemical device, including:

a porous polymer substrate having a plurality of pores; and a porous coating layer formed on at least one surface of the porous polymer substrate, and containing boehmite particles and a binder polymer positioned on the whole or a part of the surface of the boehmite particles to connect the particles with one another and fix them, wherein the boehmite particles have an average particle diameter of 2.0-3.5 μm and a specific surface area of 4.0-4.5 $m^2/g$.

Boehmite is represented by the chemical formula of AlO(OH) or $Al_2O_3 \cdot H_2O$ and is a chemically stable alumina monohydrate obtained generally by heat treatment or hydrothermal treatment of alumina trihydrate in the air. Boehmite has a high dehydration temperature of 450-530° C. and may be controlled to have various shapes, including plate-like boehmite, needle-like boehmite and hexangular plate-like boehmite, by adjusting the preparing condition. In addition, it is possible to control the aspect ratio or particle diameter by controlling the preparing condition. Therefore, it is possible to provide various applications with boehmite by using the properties thereof.

As used herein, boehmite particles have an average particle diameter (average particle diameter on the volume basis, $D_{50}$) of 2.0-3.5 μm, particularly 2.5-3.5 μm. Within the above-defined range, it is possible to realize a separator having significantly high adhesion to an electrode and significantly low resistance.

As used herein, the term 'average diameter' means the average diameter ($D_{50}$) of inorganic particles and may be defined as diameter at 50% in the diameter distribution. More particularly, the average diameter ($D_{50}$) means particle diameter of particles corresponding to 50% of the total volume, when volume is accumulated from small particles after measuring particle diameter with a particle size analyzer.

According to an embodiment of the present disclosure, the particle diameter may be determined by using a laser diffraction method. The laser diffraction method generally allows determination of particle diameter ranging from the submicron region to several nanometers and provides results with high reproducibility and high resolution.

According to the present disclosure, boehmite particles have a specific surface area of 4.0-4.5 $m^2/g$, particularly 4.0-4.2 $m^2/g$. Within the above-defined range, it is possible to realize a separator having significantly high adhesion to an electrode and significantly low resistance.

Herein, the specific surface area may be determined by using a BET specific surface area analyzer (Brunauer Emmett Teller, BET). Particularly, BELSORP-mino II available from BEL Japan may be used to calculate the specific surface area from nitrogen gas adsorption amount at a liquid nitrogen temperature (77° K).

According to the present disclosure, there is provided a separator having improved adhesion to an electrode and reduced resistance by controlling the average particle diameter and specific surface area of boehmite particles. When either or both of the average particle diameter and specific surface area of boehmite particles do not satisfy the above-defined ranges, it is not possible to realize a desired effect of the present disclosure, i.e. improved adhesion to an electrode and low resistance, at the same time.

For example, when boehmite has an average particle diameter within a range of 2.0-3.5 μm but has a specific surface area less than 4.0 $m^2/g$, not within a range of 4.0-4.5 $m^2/g$, it is difficult to disperse boehmite. In this case, the resultant separator has a resistance value equal to or similar to the resistance value of the separator according to an embodiment of the present disclosure, but it shows low adhesion to an electrode undesirably.

When boehmite particles have an average particle diameter within a range of 2.0-3.5 μm but has a specific surface area larger than 4.5 $m^2/g$, not within a range of 4.0-4.5 $m^2/g$, the resultant separator has high resistance and low adhesion to an electrode undesirably. When boehmite particles have a specific area larger than 4.5 $m^2/g$, it is difficult to disperse boehmite particles homogeneously, and thus distribution of the binder polymer in the porous coating layer may not be homogeneous. In this case, adhesion may be degraded. In addition, it seems that resistance is also increased due to a non-homogeneous surface state and a large thickness of porous coating layer.

Meanwhile, when boehmite particles have a specific surface area within a range of 4.0-4.5 $m^2/g$ but have an average particle diameter less than 2.0 μm, not within a range of 2.0-3.5 μm, adhesion to an electrode is significantly reduced and resistance is increased. It seems that when boehmite particles have a particle diameter less than 2.0 μm, it is difficult to disperse boehmite particles, resulting in an increase in resistance. It also seems that even when the same amount of binder polymer is introduced, the binder polymer has a difficulty in adhering boehmite particles with one another due to such a small average particle diameter of boehmite particles, resulting in degradation of adhesion. According to an embodiment of the present disclosure, boehmite particles may have an average particle diameter of 2.5-3.5 μm and a specific surface area of 4.0-4.2 $m^2/g$. Within the above-defined ranges, it is possible to realize a separator having significantly high adhesion to an electrode and low resistance.

According to an embodiment of the present disclosure, boehmite particles may have an average particle diameter of 3.0-3.5 μm and a specific surface area of 4.0-4.1 $m^2/g$. Within the above-defined ranges, it is possible to realize a separator having significantly high adhesion to an electrode and low resistance.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions well as a binder which connects and stably fixes the inorganic particles with one another, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polyethylhexyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

According to an embodiment of the present disclosure, the binder polymer may include a particle-type binder polymer.

The particle-type binder polymer has adhesive property, and provides binding force between the porous polymer substrate and the porous coating layer, or binding force between the porous coating layer and an electrode. In addition, the particle-type binder polymer functions to fix the inorganic particles and/or other particle-type binder polymers in the porous coating layer so that they may not be detached.

According to a particular embodiment of the present disclosure, the particle-type binder polymer is dispersed and present in an aqueous solvent, and has a spherical or pseudo-spherical shape. Herein, ‘pseudo-spherical’ shape has a three-dimensional volume, including an oval shape, and includes all types of particles, including amorphous particles, whose shape cannot be specified. However, when the particle-type binder polymer has a sphericity of approximately 1, pores can be ensured advantageously.

The particle-type binder polymer may be a microparticle polymer formed by emulsion polymerization, but is not limited thereto.

The emulsion polymerization method is not particularly limited. Any method for neutralizing monomers, an initiator and an emulsifier in an aqueous solvent, such as water, may be used, as long as it can provide a desired particle-type binder polymer according to the present disclosure. For example, a predetermined amount of emulsifier is mixed and agitated with a solvent, the resultant mixture is warmed, and then monomers are introduced thereto. Then, an initiator is introduced to induce polymerization of the monomers. The resultant product is allowed to stand for several minutes to several hours to obtain polymer particles as polymerized microparticles.

In the separator according to an embodiment of the present disclosure, the particle-type binder polymer may include rubber, a water-dispersible acrylic polymer, or a copolymer of acrylic polymer.

In addition, the particle-type binder polymer may include polyacrylonitrile, polyvinyl chloride, polyvinylidene fluoride, polyvinyl alcohol, styrene, polycyanoacrylate or a mixture of two or more of them. Such a binder polymer has excellent adhesion, and thus can bind inorganic particles effectively even when it is used in a small amount.

Non-limiting examples of the rubber that may be used herein include any one selected from the group consisting of styrene butadiene rubber (SBR), acrylonitrile-butadiene rubber and acrylonitrile-butadiene-styrene rubber, or a mixture of two or more of them.

In addition, the water-dispersible (meth)acrylic polymer may include any one selected from the group consisting of polyethyl acrylate, polyethyl methacrylate, polypropyl acrylate, polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate and polylauryl methacrylate, or a mixture of two or more of them.

In addition, the copolymer of acrylic polymer may be polymethyl methacrylate-co-ethylhexyl acrylate, wherein methyl methacrylate and ethylhexyl acrylate are copolymerized at a molar ratio of 25:75-50:50.

The acrylic copolymer may be a copolymer polymerized from butyl methacrylate and butyl acrylate at a molar ratio of 25:75-50:50.

The particle-type binder polymer may have a core-shell structure. According to a particular embodiment of the present disclosure, the particle-type binder polymer may include an acrylic copolymer polymerized from butyl acrylate and methyl methacrylate in the core portion, and may include styrene in the shell portion.

According to an embodiment of the present disclosure, the particle-type binder polymer may be used in an amount of 70-99 parts by weight, 75-98 parts by weight, or 80-95.3 parts by weight, based on 100 parts by weight of the total binder polymers. Within the above-defined range, it is possible to provide a separator having excellent adhesion to an electrode and low resistance by virtue of an adequate proportion of particle-type binder polymer.

Meanwhile, according to an embodiment of the present disclosure, the binder polymer contained in the porous coating layer may be non-particle type binder polymer except the particle-type binder polymer.

According to an embodiment of the present disclosure, ‘non-particle type binder polymer’ means a binder polymer not dispersed in water as a solvent but dissolved therein.

According to an embodiment of the present disclosure, the weight ratio of the inorganic particles:total binder polymers may be 80:20-50:50. When the weight ratio of the inorganic particles to the total binder polymers satisfies the above-defined range, it is possible to prevent the problem of a decrease in pore size and porosity of the resultant coating layer, caused by an increase in content of the binder polymer. It is also possible to solve the problem of degradation of peeling resistance of the resultant coating layer, caused by a decrease in content of the binder polymer.

According to an embodiment of the present disclosure, the porous coating layer may be formed on either surface or both surfaces of the porous polymer substrate.

According to the present disclosure, the porous polymer substrate is a porous membrane, and can provide channels through which lithium ions are transported, while electrically insulating an anode and a cathode from each other to prevent a short-circuit. Any porous polymer substrate may be used with no particularly limitation, as long as it is conventionally used as a material for a separator in an electrochemical device.

Particularly, the porous polymer substrate may be a porous polymer film substrate or a porous polymer nonwoven web substrate.

The porous polymer film substrate may be a porous polymer film including polyolefin, such as polyethylene, polypropylene, polybutene or polypentene. Such a polyolefin porous polymer film substrate may realize a shutdown function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film may be obtained by molding various polymers, such as polyesters, other than polyolefins, into a film shape. Further, the porous polymer film may have a laminate structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins In addition, there is no particular limitation in the thickness of the porous substrate, the porous substrate has a thickness of 1-100 μm, particularly 5-50 μm. Recently, as batteries have been provided with high output/high capacity, it is advantageous that a thin film is used as a porous polymer substrate. The pores present in the porous polymer substrate may have a diameter of 10-100 nm, 10-70 nm, 10-50 nm, or 10-35 nm, and a porosity of 5-90%, preferably 20-80%. However, such numerical ranges may be varied if necessary or according to a particular embodiment.

The pores of the porous polymer substrate may have various types of pore structures. Any pore structure is included in the scope of the present disclosure, as long as any one average pore size selected from average pore size determined by using a porosimeter or average pore size observed through field emission scanning electron microscopy (FE-SEM) satisfies the above-defined range.

Herein, in the case of a uniaxially oriented dry separator generally known to those skilled in the art, the average pore size may be based on the central pore size in the pore size along the transverse direction (TD), not the pore size along the machine direction (MD). In a variant, in the case of a porous polymer substrate (e.g. wet polyethylene (PE) separator) having a network structure, the average pore size may be based on the pore size determined by using a porosimeter.

According to an embodiment of the present disclosure, the porous coating layer is provided in the form of a thin film.

Particularly, when the porous coating layer is coated on one surface, it may have a thickness of 2-10 μm, 2-5 μm, or 2-3 μm.

When the porous coating layers are coated on both surfaces, the total thickness of porous coating layers may be 4-20 μm, 4-15 μm, or 4-8 μm.

As mentioned above, the separator according to an embodiment of the present disclosure is provide in the form of a thin film, and may have improved heat shrinkage as compared to the conventional separators by controlling the particle diameter and specific surface area of boehmite particles.

The porosity of porous coating layer is not particularly limited, but may be 35-65% preferably.

The separator according to an embodiment of the present disclosure may further include other additives as ingredients of the porous coating layer, besides the above-described inorganic particles and binder polymer.

The separator according to an embodiment of the present disclosure may be obtained by a method generally known to those skilled in the art.

For example, the separator according to an embodiment of the present disclosure may be obtained by the method as described hereinafter, but is not limited thereto.

First, slurry for forming a porous coating layer may be obtained by dispersing boehmite particles and a particle-type binder polymer in a solvent. The inorganic particles and/or particle-type binder polymer may be added after they are pulverized in advance to a predetermined average particle diameter. Otherwise, the inorganic particles and/or particle-type binder polymer may be added to a binder polymer solution, and then pulverized and dispersed while controlling them to have a predetermined average particle diameter by using a ball milling process, or the like.

Then, the slurry for forming a porous coating layer is applied to at least one surface of the porous polymer substrate, followed by drying, to form a porous coating layer.

According to an embodiment of the present disclosure, the solvent may be water.

Although there is no particular limitation in the process for coating the slurry for forming a porous coating layer onto the porous substrate, it is preferred to use a slot coating or dip coating process. A slot coating process includes coating a slurry supplied through a slot die onto the whole surface of a substrate and is capable of controlling the thickness of a coating layer depending on the flux supplied from a metering pump. In addition, dip coating includes dipping a substrate into a tank containing a slurry to carry out coating and is capable of controlling the thickness of a coating layer depending on the concentration of the slurry and the rate of removing the substrate from the slurry tank. Further, in order to control the coating thickness more precisely, it is possible to carry out post-metering through a Mayer bar or the like, after dipping.

Then, the porous polymer substrate coated with the slurry for forming a porous coating layer is dried by using a dryer, such as an oven, thereby forming porous coating layers on at least one surface of the porous substrate.

In the porous coating layer, the inorganic particles and/or particle-type binder polymer is bound to one another by the binder polymer, while they are packed and are in contact with each other. Thus, interstitial volumes are formed among the inorganic particles and/or particle-type binder polymer and the interstitial volumes in the inorganic particles or particle-type binder polymer may become vacant spaces to form pores.

In other words, the binder polymer attaches the inorganic particles and/or particle-type binder polymer to one another so that they may retain their binding states. For example, the binder polymer connects and fixes the inorganic particles and/or particle-type binder polymer with one another. In addition, the pores of the porous coating layer are those formed by the interstitial volumes among the inorganic particles and/or particle-type binder polymer which become vacant spaces. The space may be defined by the inorganic particles and/or particle-type binder polymer facing one another substantially in a closely packed or densely packed structure of the inorganic particles and/or particle-type binder polymer.

In another aspect of the present disclosure, there is provided an electrochemical device including a cathode, an anode and a separator interposed between the cathode and the anode, wherein the separator is the above-described separator.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

1) Manufacture of Anode

Artificial graphite as an anode active material, carbon black, carboxymethyl cellulose (CMC) and styrene butadiene rubber (SBR) were introduced to water at a weight ratio of 96:1:2:2 and mixed therein to prepare anode slurry. The anode slurry was coated onto copper (Cu) foul having a thickness of 50 μm as an anode current collector at a capacity of 3.55 mAh/g to form a thin electrode plate, which, in turn, was dried at 135° C. for 3 hours or more and then pressed to obtain an anode.

2) Manufacture of Cathode $LiNi_{0.6}Co_{0.2}Mn_{0.2}O_2$ as a cathode active material, carbon black and polyvinylidene fluoride (PVdF) were introduced to N-methyl-2-pyrrolidone at a weight ratio of 96:2:2 and mixed therein to prepare cathode slurry. The cathode slurry was coated on aluminum foil having a thickness of 20 μm as a cathode current collector at a capacity of 3.28 $mAh/cm^2$ to obtain a cathode.

3) Manufacture of Separator

Boehmite (AlO(OH)) inorganic particles (average particle diameter: 2.0 μm, specific surface area: 4.3 $m^2/g$, Mohs hardness: 3.5), polymethyl methacrylate-co-ethylhexyl acrylate (Hansol Chemical Co., HCl2) as a particle-type binder polymer and carboxymethyl cellulose as a binder polymer were introduced to water, and the inorganic particles were pulverized and dispersed by using a ball milling process for 12 hours to prepare slurry for forming a porous coating layer having a solid content of 20%. Herein, the weight ratio of boehmite particles:carboxymethyl cellulose: poly polymethyl methacrylate-co-ethylhexyl acrylate was controlled to 70:1.4:28.6.

The slurry for forming a porous coating layer was applied to one surface of a polyethylene porous film (thickness 8.5 μm, porosity 45%) through a slot coating process under the conditions of 23° C. and a relative humidity of 40% to a total loading amount of 13.5 $g/m^2$. Then, the slurry was dried to obtain a separator having a porous coating layer.

4) Adhesion Between Separator and Electrode

Then, the separator was stacked on the electrode in such a manner that the porous coating layer of the separator might face the anode active material layer of the electrode obtained from 1), and pressing was carried out at 70° C. under 600 kgf for 1 second to obtain an electrode assembly including the anode laminated with the separator.

EXAMPLES 2 and 3

Electrode assemblies were obtained in the same manner as Example 1, except that average particle diameter and specific surface area of boehmite particles were controlled as shown in the following Table 1.

COMPARATIVE EXAMPLE 1

An electrode assembly was obtained in the same manner as Example 1, except that the polyethylene porous film having a thickness of 8.5 μm was used as it was, i.e. without formation of a porous coating layer.

The porous polymer substrate used herein had an average pore size of 43.9 nm and a porosity of 45%.

COMPARATIVE EXAMPLE 2

An electrode assembly was obtained in the same manner as Example 1, except that alumina particles (average particle diameter: 0.5 μm, specific surface area: 8 $m^2/g$, Mohs hardness: 9) were used instead of boehmite particles.

COMPARATIVE EXAMPLES 3-7

Electrode assemblies were obtained in the same manner as Example 1, except that average particle diameter and specific surface area of boehmite particles were controlled as shown in the following Table 1.

TABLE 1

| | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex.6 | Comp. Ex. 7 | Comp. Ex. 8 |
|---|---|---|---|---|---|---|---|---|---|---|---|
| Particle type, average particle diameter (μm) | Boehmite, 2.0 | Boehmite, 2.5 | Boehmite, 3.5 | — | Alumina, 0.5 | Boehmite, 1.2 | Boehmite, 0.9 | Boehmite, 2.0 | Boehmite, ~~2.0~~ 3.5 | Boehmite, 4.0 | Alumina, 2.5 |
| Particle specific surface area ($m^2/g$) | Boehmite, 4.3 | Boehmite, 4.2 | Boehmite, 4.0 | — | Alumina, 8 | Boehmite, 4.0 | Boehmite, 6.0 | Boehmite, 5.2 | Boehmite, 2.9 | Boehmite, 1.9 | Alumina, 4.0 |
| Separator thickness (μm) | 11.3 | 11.5 | 11.0 | 8.5 | 11.8 | 11.6 | 11.7 | 12.0 | 11.9 | 12.4 | 11.6 |
| Coating layer section thickness (μm) | 2.8 | 3.0 | 2.5 | — | 3.3 | 3.1 | 3.2 | 3.5 | 3.4 | 3.9 | 3.1 |
| Packing density ($g/cm^3$) | 1.50 | 1.43 | 1.68 | — | 1.69 | 1.39 | 1.44 | 1.40 | 1.32 | 1.31 | 1.67 |
| Heat shrinkage (MD/TD)(%) (at 150° C.) | 42/40 | 42/40 | 40/38 | 86/84 | 58/54 | 46/46 | 44/44 | 46/44 | 46/46 | 40/40 | 56/56 |
| Loading amount of slurry for forming porous coating layer ($g/m^2$) | 4.2 | 4.3 | 4.2 | — | 5.6 | 4.3 | 4.6 | 4.9 | 4.5 | 5.1 | 5.2 |
| Air permeability (s/100 cc) | 89 | 92 | 84 | 70 | 99 | 102 | 90 | 97 | 98 | 111 | 92 |
| Lami strength (gf/15 mm) | 24.1 | 27.6 | 28.9 | — | 12.0 | 9.2 | 14.4 | 15.6 | 13.1 | 10.4 | 12.8 |
| Resistance (ohm) | 0.88 | 0.89 | 0.83 | 0.39 | 0.97 | 0.91 | 0.92 | 1.01 | 0.89 | 0.95 | 0.94 |

Evaluation Results

Each of the electrode assemblies according to Examples 1-3 and Comparative Examples 1-8 was evaluated in terms of thickness, particle diameter, separator-anode adhesion (gf/15 mm) and resistance. The results are shown in Table 1.

Particular test methods are as follows.

1) Determination of Average Particle Diameter of Inorganic Particles

The particle diameter of inorganic particles was determined by using a laser diffraction method (Microtrac MT 3000).

2) Determination of Specific Surface Area of Inorganic Particles

A BET specific surface area analyzer (Brunauer Emmett Teller, BET) was used. Particularly, specific surface area of inorganic particles can be calculated from nitrogen gas adsorption amount at liquid nitrogen temperature (77° K) by using BELSORP-mino II available from BEL Japan.

3) Determination of Thickness

The thickness of a separator was determined by using a thickness analyzer (VL-50S-B available from Mitutoyo Co.).

4) Determination of Air Permeability

The air permeability was determined by using a Gurley type air permeability tester according to JIS P-8117. Herein, the time required for 100 cc of air to pass through a diameter of 28.6 mm and an area of 645 $mm^2$ was measured.

5) Determination of Separator-Anode Adhesion (gf/15 mm) (Lami Strength)

An anode was manufactured in the same manner as Example 1-1) and cut into a size of 15 mm×100 mm. Each of the separators according to Examples 1-3 and Comparative Examples 1-8 was cut into a size of 25 mm×100 mm. The separator was stacked with the anode, and the stack was inserted between PET films having a thickness of 100 μm and adhered by using a flat press. Herein, the flat press was heated and pressurized at 70° C. under a pressure of 600 kgf for 1 second. The adhered separator and anode were attached to slide glass by using a double-sided tape. The end portion (10 mm or less from the end of the adhered surface) of the separator was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the upper holder of the UTM instrument. Then, force was applied at 180° and a rate of 300 mm/min. The force required for separating the anode from the porous coating layer facing the anode was measured.

6) Determination of Resistance

Each of the separators according to Examples 1-3 and Comparative Examples 1-8 was impregnated with an electrolyte and the resistance was measured. The resistance was determined by using 1M LiPF6-ethylene carbonate/ethyl methyl carbonate (weight ratio 3:7) as an electrolyte at 25° C. through an alternate current process.

7) Determination of Heat Shrinkage

The heat shrinkage was calculated according to the formula of (Initial length−Length after heat shrinking treatment at 150° C. for 30 minutes)/(Initial length)×100.

As can be seen from Table 1, Examples 1-3 show a low air permeability value and a high adhesion to an electrode of 20 gf/15 mm or more. In addition, Examples 1-3 provide separators having low resistance and improved heat resistance.

On the contrary, in the case of Comparative Example 1 including no porous coating layer, it shows a high heat shrinkage of 86% and 84% in the machine direction (MD) and the transverse direction (TD), respectively, which correspond to about 2 times higher than the heat shrinkage of Examples.

In the case of Comparative Example 2 using alumina particles, it shows an adhesion to an electrode corresponding to 50% of the adhesion to an electrode according to Examples. It also shows a high heat shrinkage, and thus cannot provide a desired separator according to the present disclosure.

In the case of Comparative Example 3 using boehmite having an excessively small particle diameter, it is not possible to obtain a desired level of adhesion to an electrode. Moreover, it shows a higher resistance value as compared to Examples.

In the case of Comparative Example 4 using boehmite having a small particle diameter and a large specific surface area, it is not possible to obtain a desired level of adhesion to an electrode. Moreover, it shows a higher resistance value as compared to Examples.

In the case of Comparative Examples 5 and 6 using boehmite having a specific surface area not within a range of 4.0-4.5 $m^2/g$, it is not possible to obtain a desired level of adhesion to an electrode. Moreover, it shows a higher resistance value as compared to Examples.

In the case of Comparative Example 7, it shows a low heat shrinkage but cannot provide improved adhesion to an electrode.

In the case of Comparative Example 8, heat shrinkage is not improved as compared to the other examples using boehmite. Particularly, at the same packing density, boehmite provides a higher effect of improving heat shrinkage.

Meanwhile, when comparing Examples and Comparative Examples under the same porous coating layer thickness, it can be seen that the separators according to the present disclosure provide a significantly higher effect of improving heat shrinkage, although they use thin films.

What is claimed is:

1. A separator for an electrochemical device, comprising:

a porous polymer substrate having a plurality of pores; and a porous coating layer on at least one surface of the porous polymer substrate, wherein the porous coating layer comprises boehmite particles and a binder polymer, wherein the binder polymer is positioned on at least a part of a surface of the boehmite particles and connects and fixes the boehmite particles with one another, wherein the boehmite particles have an average particle diameter of 2.0 μm to 3.5 μm and a specific surface area of 4.0 $m^2/g$ to 4.5 $m^2/g$, wherein the porous coating layer has a thickness of 2 μm to 10 μm, and wherein an adhesion strength of the separator to an electrode (Lami strength) is 20 gf/15 mm or more, and a resistance of the separator is 0.90 ohm or less.

2. The separator for the electrochemical device according to claim 1, wherein the binder polymer comprises a particle-type binder polymer.

3. The separator for the electrochemical device according to claim 2, wherein the particle-type binder polymer comprises at least one of styrene butadiene rubber, acrylonitrile-butadiene rubber, acrylonitrile-butadiene-styrene rubber, polymethyl methacrylate-co-ethylhexyl acrylate, polyacrylonitrile, polyvinyl chloride, polyvinylidene fluoride, polyvinyl alcohol, styrene, or polycyanoacrylate.

4. The separator for the electrochemical device according to claim 1, wherein a weight ratio of the inorganic particles: total binder polymers is from 80:20 to 50:50.

5. The separator for the electrochemical device according to claim 2, wherein the particle-type binder polymer is present in an amount of 70 to 99 parts by weight based on 100 parts by weight of a total amount of the binder polymer.

6. The separator for the electrochemical device according to claim 1, wherein the porous polymer substrate is a polyolefin-based porous polymer film substrate or a porous polymer nonwoven web substrate.

7. The separator for the electrochemical device according to claim 6, wherein the porous polymer substrate is the polyolefin-based porous polymer film substrate, which comprises at least one of polyethylene, polypropylene, polybutylene, or polypentene.

8. The separator for the electrochemical device according to claim 1, wherein the porous coating layer has a thickness of 2 μm to 3 μm.

9. The separator for the electrochemical device according to claim 1, wherein the porous coating layer is formed on both surfaces of the porous polymer substrate, and a total thickness of the porous coating layers is 4 μm to 20 μm.

10. The separator for the electrochemical device according to claim 1, wherein the separator has a heat shrinkage of 42% or less in a machine direction and a heat shrinkage of 40% or less in a transverse direction at a temperature of 150° C.

11. An electrochemical device comprising:

a cathode, an anode, and a separator interposed between the cathode and the anode, wherein the separator is the separator as defined in claim 1.

12. The electrochemical device according to claim 11, wherein the electrochemical device is a lithium secondary battery.

* * * * *